United States Patent
Kim et al.

(10) Patent No.: US 10,075,867 B2
(45) Date of Patent: Sep. 11, 2018

(54) METHOD AND APPARATUS FOR MAINTAINING MBMS MDT CONFIGURATION IN WIRELESS COMMUNICATION SYSTEM

(71) Applicant: LG ELECTRONICS INC., Seoul (KR)

(72) Inventors: Sangwon Kim, Seoul (KR); Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/117,142

(22) PCT Filed: Mar. 11, 2015

(86) PCT No.: PCT/KR2015/002371
§ 371 (c)(1),
(2) Date: Aug. 5, 2016

(87) PCT Pub. No.: WO2015/141982
PCT Pub. Date: Sep. 24, 2015

(65) Prior Publication Data
US 2016/0353308 A1 Dec. 1, 2016

Related U.S. Application Data

(60) Provisional application No. 61/953,745, filed on Mar. 15, 2014, provisional application No. 61/954,564, filed on Mar. 17, 2014.

(51) Int. Cl.
*H04W 24/10* (2009.01)
*H04W 4/06* (2009.01)
(Continued)

(52) U.S. Cl.
CPC ............ *H04W 24/10* (2013.01); *H04W 4/06* (2013.01); *H04W 36/08* (2013.01); *H04W 88/02* (2013.01); *H04W 88/16* (2013.01)

(58) Field of Classification Search
None
See application file for complete search history.

(56) References Cited

U.S. PATENT DOCUMENTS

| 2011/0195668 A1* | 8/2011 | Lee | ........................ H04W 24/10 455/67.11 |
| 2011/0250910 A1* | 10/2011 | Lee | ........................ H04W 24/10 455/466 |

(Continued)

FOREIGN PATENT DOCUMENTS

| WO | 2012047070 A2 | 4/2012 |
| WO | 2013055084 A1 | 4/2013 |

*Primary Examiner* — Mohammad Sajid Adhami
(74) *Attorney, Agent, or Firm* — Lee Hong Degerman Kang Waimey

(57) ABSTRACT

A method and apparatus for maintaining a multimedia broadcast multicast service (MBMS) minimization of drive test (MDT) configuration in a wireless communication system is provided. A user equipment (UE) receives a first MBMS-MDT configuration via first system information, and receives second system information. The second system information may or may not include a second MBMS-MDT configuration. If the second system information does not include the second MBMS-MDT configuration or the second system information includes the second MBMS-MDT configuration which is equivalent to the first MBMS-MDT configuration. the UE maintains the first MBMS-MDT configuration.

11 Claims, 13 Drawing Sheets

(51) Int. Cl.
*H04W 36/08* (2009.01)
*H04W 88/02* (2009.01)
*H04W 88/16* (2009.01)

(56) References Cited

U.S. PATENT DOCUMENTS

| | | |
|---|---|---|
| 2013/0010624 A1 | 1/2013 | He et al. |
| 2013/0128756 A1 | 5/2013 | Zhang et al. |
| 2013/0265903 A1 | 10/2013 | Kim et al. |
| 2016/0212595 A1* | 7/2016 | Fukuta ................ H04W 76/002 |
| 2016/0330644 A1* | 11/2016 | Li ........................ H04W 24/10 |

* cited by examiner

METHOD AND APPARATUS FOR MAINTAINING MBMS MDT CONFIGURATION IN WIRELESS COMMUNICATION SYSTEM

CROSS-REFERENCE TO RELATED APPLICATIONS

This application is the National Stage filing under 35 U.S.C. 371 of International Application No. PCT/KR2015/002371, filed on Mar. 11, 2015, which claims the benefit of U.S. Provisional Application No. 61/953,745, filed on Mar. 15, 2014 and 61/954,564, filed on Mar. 17, 2014, the contents of which are all hereby incorporated by reference herein in their entirety.

BACKGROUND OF THE INVENTION

Field of the Invention

The present invention relates to wireless communications, and more particularly, to a method and apparatus for maintaining a multimedia broadcast multicast service (MBMS) minimization of drive test (MDT) configuration in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Minimization of drive tests (MDT) is a feature introduced in 3GPP LTE rel-10 to allow the harvesting of network coverage and quality information from customer user equipments (UEs) as they move within the coverage of the radio access network (RAN). This provides better quality data, at a lower cost, than that produced by the RAN operator performing drive testing of the RAN using test UEs.

The concept of MDT may be applied to MBMS, which may be referred to as MBMS-MDT. For a user equipment (UE) which is interested to receive MBMS or is receiving MBMS, MBMS-MDT may be configured and performed. The purpose of MBMS-MDT is allowing for the network operator harvesting of network coverage and quality information from UEs related to MBMS, which means that UEs can report areas in which MBMS cannot be received without enough quality. For configuration of MBMS-MDT, MBMS-MDT configuration may be provided by a network.

The MBMS-MDT configuration may be provided via system information. The system information is transmitted by cell-specific manner, i.e. only valid in a specific cell. Therefore, if a new cell, to which the UE is handed over, does not provide the MBMS-MDT configuration via system information, the previously configured MBMS-MDT should be discarded. However, considering the purpose of the MBMS-MDT, it may be required that the previously configured MBMS-MDT needs to be maintained in the new cell.

SUMMARY OF THE INVENTION

The present invention provides a method and apparatus for maintaining a multimedia broadcast multicast service (MBMS) minimization of drive test (MDT) configuration in a wireless communication system. The present invention provides a method for maintaining a stored MBMS-MDT configuration received via system information of a previous cell when a user equipment (UE) is handed over to a new cell.

In an aspect, a method for maintaining, by a user equipment (UE), a multimedia broadcast multicast service (MBMS) minimization of drive test (MDT) configuration in a wireless communication system is provided. The method includes receiving, by the UE, a first MBMS-MDT configuration via first system information, receiving, by the UE, second system information, and maintaining, by the UE, the first MBMS-MDT configuration, if the second system information does not include a second MBMS-MDT configuration or the second system information includes the second MBMS-MDT configuration which is equivalent to the first MBMS-MDT configuration.

In another aspect, a user equipment (UE) configured to maintain a multimedia broadcast multicast service (MBMS) minimization of drive test (MDT) configuration in a wireless communication system is provided. The UE includes a radio frequency (RF) unit configured to transmit or receive a radio signal, and a processor coupled to the RF unit, and configured to receive a first MBMS-MDT configuration via first system information, receive second system information, and maintain the first MBMS-MDT configuration, if the second system information does not include a second MBMS-MDT configuration or the second system information includes the second MBMS-MDT configuration which is equivalent to the first MBMS-MDT configuration.

Even after a UE is handed over to a new cell, a MBMS-MDT configuration, which is received from a previous cell, can be maintained.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
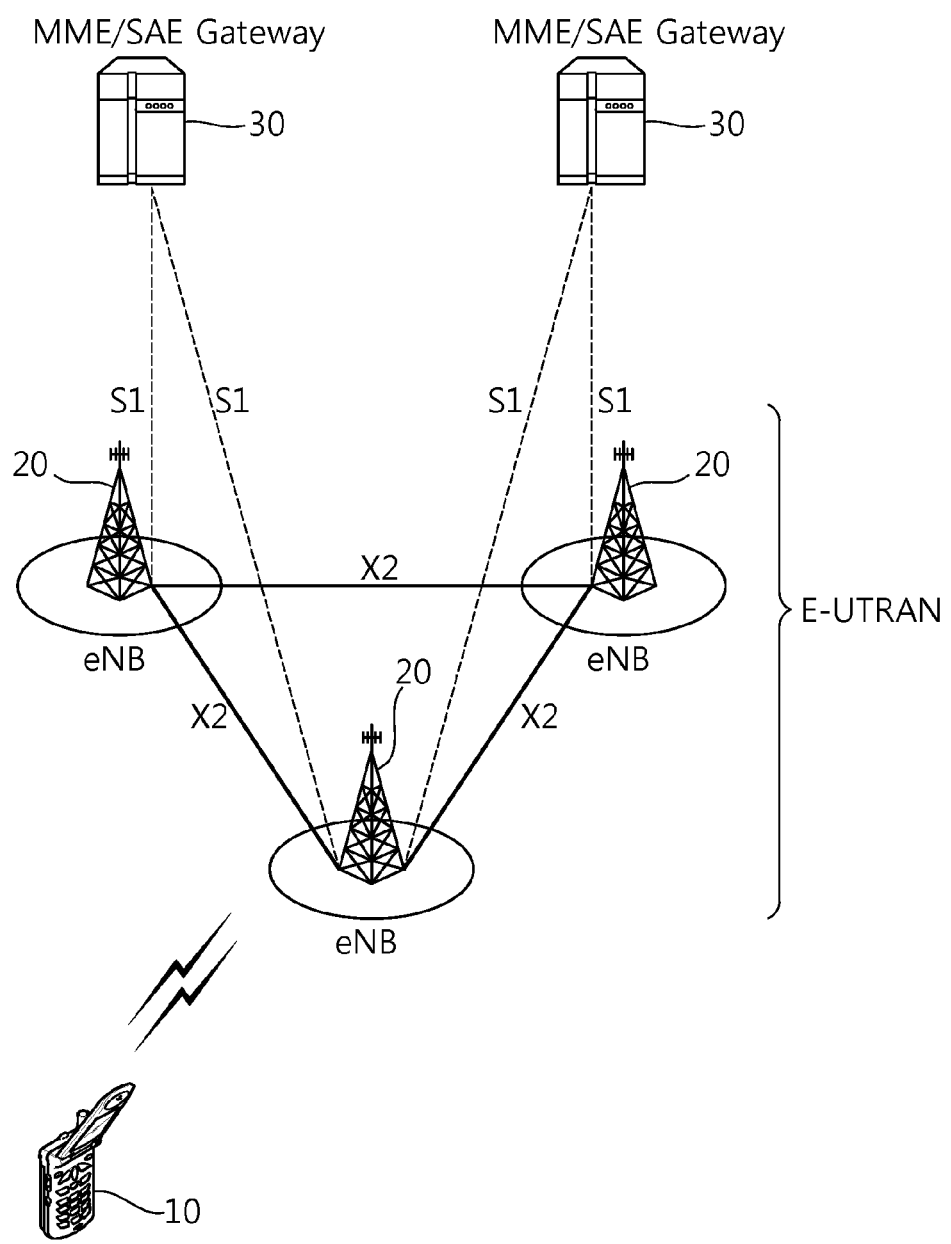
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
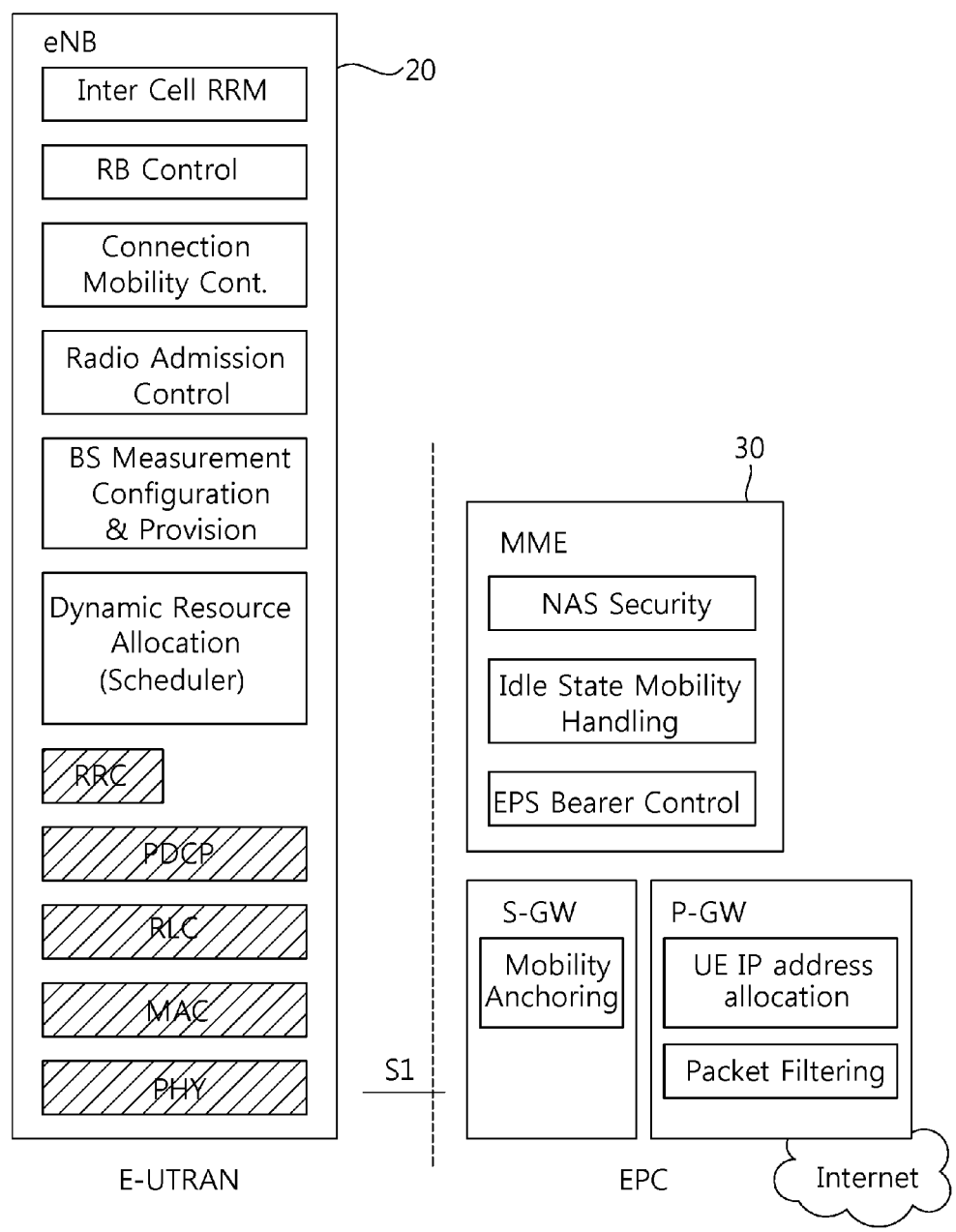
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
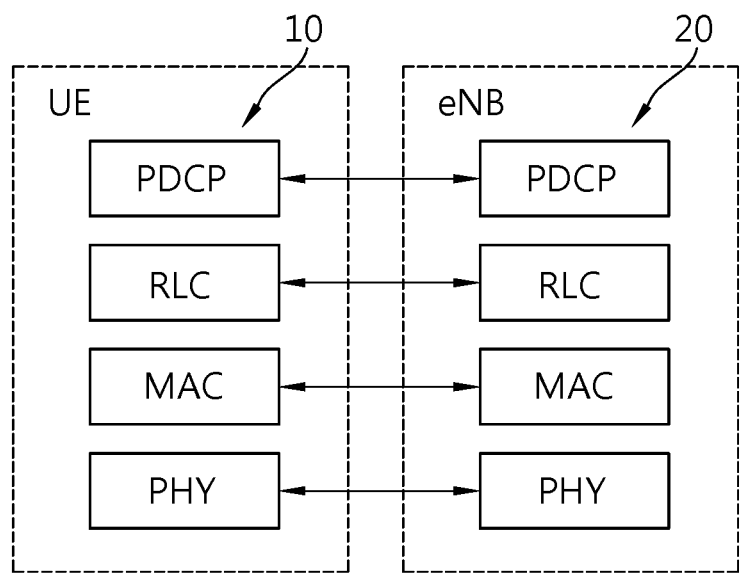
FIG. 3 shows a block diagram of a user plane protocol stack of an LTE system.
Figure 4:
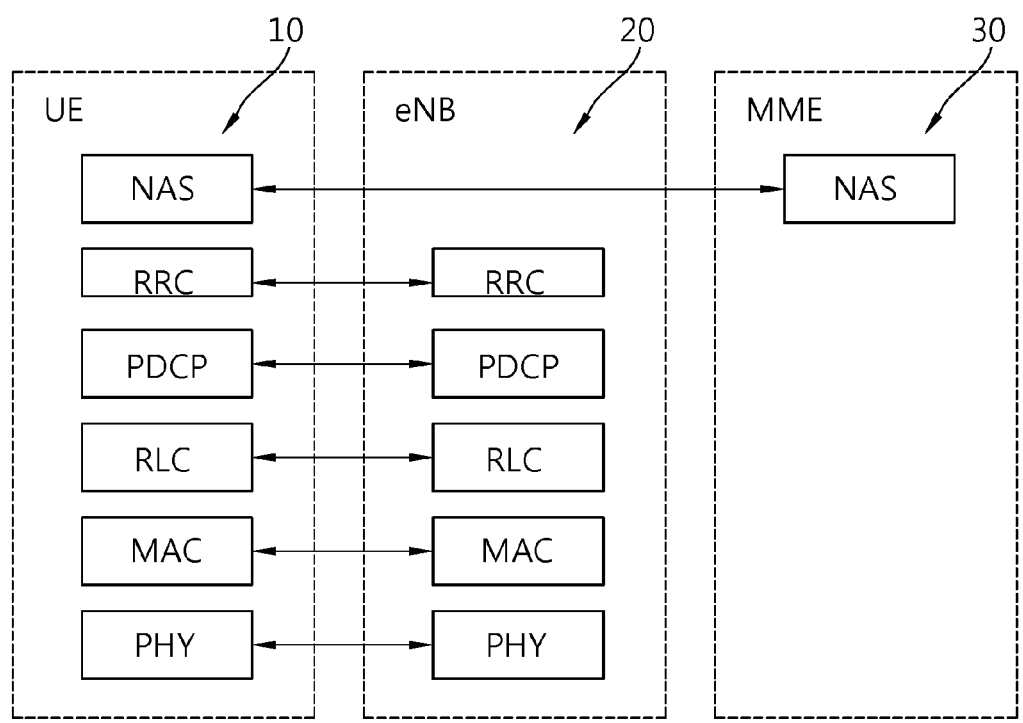
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
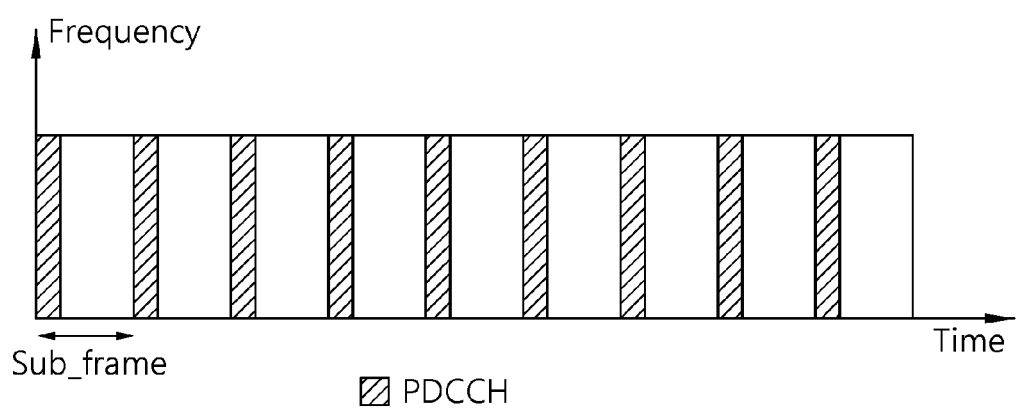
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Minimization of drive tests (MDT) is described. In may be referred to 3GPP TS 37.320 V11.3.0 (2013-03) and Section 5.6.6 and 5.6.8 of 3GPP TS 36.331 V11.5.0 (2013-09). The general principles and requirements guiding the definition of functions for MDT are the following.

1. MDT mode: There are two modes for the MDT measurements, which are logged MDT and immediate MDT. The logged MDT is MDT functionality involving measurement logging by the UE in IDLE mode, CELL_PCH and URA_PCH states (when the UE is in UTRA) for reporting to eNB/radio network controller (RNC) at a later point in time. The immediate MDT is MDT functionality involving measurements performed by the UE in CONNECTED state and reporting of the measurements to eNB/RNC available at the time of reporting condition as well as measurements by the network for MDT purposes. There are also cases of measurement collection not specified as either immediate or logged MDT, such as accessibility measurements.

2. UE measurement configuration: It is possible to configure MDT measurements for the UE logging purpose independently from the network configurations for normal radio resource management (RRM) purposes. However, in most cases, the availability of measurement results is conditionally dependent on the UE RRM configuration.

3. UE measurement collection and reporting: UE MDT measurement logs consist of multiple events and measurements taken over time. The time interval for measurement collection and reporting is decoupled in order to limit the impact on the UE battery consumption and network signaling load.

4. Geographical scope of measurement logging: It is possible to configure the geographical area where the defined set of measurements shall be collected.

5. Location information: The measurements shall be linked to available location information and/or other information or measurements that can be used to derive location information.

6. Time information: The measurements in measurement logs shall be linked to a time stamp.

7. UE capability information: The network may use UE capabilities to select terminals for MDT measurements.

8. Dependency on self-optimizing network (SON): The solutions for MDT are able to work independently from SON support in the network. Relation between measurements/solution for MDT and UE side SON functions shall be established in a way that re-use of functions is achieved where possible.

9. Dependency on TRACE: The subscriber/cell trace functionality is reused and extended to support MDT. If the MDT is initiated toward to a specific UE (e.g., based on international mobile subscriber identity (IMSI), international mobile station equipment identity (IMEI) software version (SV), etc.), the signalling based trace procedure is used, otherwise the management based trace procedure (or cell traffic trace procedure) is used.

The solutions for MDT shall take into account the following constraints:

1. UE measurements: The UE measurement logging mechanism is an optional feature. In order to limit the impact on UE power consumption and processing, the UE measurement logging should as much as possible rely on the measurements that are available in the UE according to radio resource management enforced by the access network.

2. Location information: The availability of location information is subject to UE capability and/or UE implementation. Solutions requiring location information shall take into account power consumption of the UE due to the need to run its positioning components.

Logged MDT procedure is described. Support of logged MDT complies with the principles for idle mode measurements in the UE. Furthermore, measurement logging is differentiated based on UE states in idle mode, i.e. camped normally, any cell selection or camped on any cell. The UE shall perform measurement logging in "camped normally" state. In "any cell selection" and "camped on any cell" state the UE is not required to perform MDT measurement logging (including time and location information). For logged MDT, the configuration, measurement collection and reporting of the concerning measurement will always be done in cells of the same RAT type.

Figure 6:
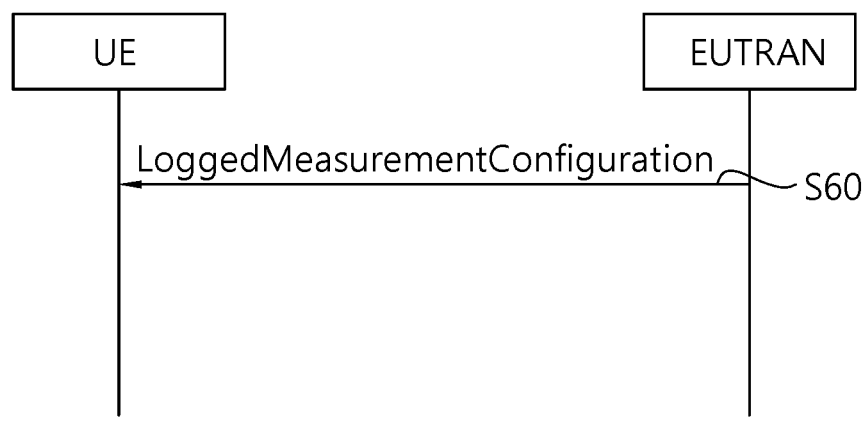
FIG. 6 shows a logged measurement configuration procedure.

FIG. 6 shows a logged measurement configuration procedure. The purpose of the logged measurement procedure is to configure the UE to perform logging of measurement results while in RRC_IDLE. The logged measurement procedure applies to logged measurements capable UEs that are in RRC_CONNECTED. In step S60, the E-UTRAN initiates the logged measurement configuration procedure to the UE in RRC_CONNECTED by sending the LoggedMeasurementConfiguration message, which is used to transfer configuration parameters for logged MDT. This is a unidirectional RRC signaling procedure. A release operation for logged measurement configuration in the UE is realized only by configuration replacement when the configuration is overwritten or by configuration clearance in case a duration timer stopping or expiration condition is met.

Upon receiving the LoggedMeasurementConfiguration message, the UE shall:

1> discard the logged measurement configuration as well as the logged measurement information;

1> store the received loggingDuration, loggingInterval and area Configuration, if included, in VarLogMeasConfig;

1> if the LoggedMeasurementConfiguration message includes plmn-IdentityList;

2> set plmn-IdentityList in VarLogMeasReport to include the registered PLMN (RPLMN) as well as the PLMNs included in plmn-IdentityList;

1> else:

2> set plmn-IdentityList in VarLogMeasReport to include the RPLMN;

1> store the received absoluteTimeInfo, traceReference, traceRecordingSessionRef and tee-Id in VarLogMeasReport;

1> start timer T330 with the timer value set to the loggingDuration;

Upon expiry of T330, the UE shall:
1> release VarLogMeasConfig;

The UE is allowed to discard stored logged measurements, i.e. to release VarLogMeasReport 48 hours after T330 expiry.

Release of logged measurement configuration procedure may release the logged measurement configuration as well as the logged measurement information. The UE shall initiate the release of logged measurement configuration procedure upon receiving a logged measurement configuration in another RAT. The UE shall also initiate the procedure upon power off or detach. The UE shall:
1> stop timer T330, if running;
1> if stored, discard the logged measurement configuration as well as the logged measurement information, i.e. release the UE variables VarLogMeasConfig and VarLogMeasReport;

Measurements logging procedure specifies the logging of available measurements by a UE in RRC_IDLE that has a logged measurement configuration. While T330 is running, the UE shall:
1> perform the logging in accordance with the following:
2> if the UE is camping normally on an E-UTRA cell and if the RPLMN is included in plmn-IdentityList stored in VarLogMeasReport and, if the cell is part of the area indicated by area Configuration if configured in VarLogMeasConfig:
3> perform the logging at regular time intervals, as defined by the loggingInterval in VarLogMeasConfig;
2> when adding a logged measurement entry in VarLogMeasReport, include the fields in accordance with the following:
3> set the relativeTimeStamp to indicate the elapsed time since the moment at which the logged measurement configuration was received;
3> if detailed location information became available during the last logging interval, set the content of the locationInfo as follows:
4> include the locationCoordinates;
4> if available, include the uncertainty;
4> if available, include the confidence;
3> set the servCellIdentity to indicate global cell identity of the cell the UE is camping on;
3> set the measResultServCell to include the quantities of the cell the UE is camping on;
3> if available, set the measResultNeighCells, in order of decreasing ranking-criterion as used for cell re-selection, to include neighbouring cell measurements that became available during the last logging interval for at most the following number of neighbouring cells; 6 intra-frequency and 3 inter-frequency neighbours per frequency as well as 3 inter-RAT neighbours, per frequency/set of frequencies (GERAN) per RAT;
2> when the memory reserved for the logged measurement information becomes full, stop timer T330 and perform the same actions as performed upon expiry of T330;

MBMS is described. It may be referred to Section 15 of 3GPP TS 36.300 V11.7.0 (2013 September) and Section 5.8 of 3GPP TS 36.331 V11.5.0 (2013 September).

Figure 7:
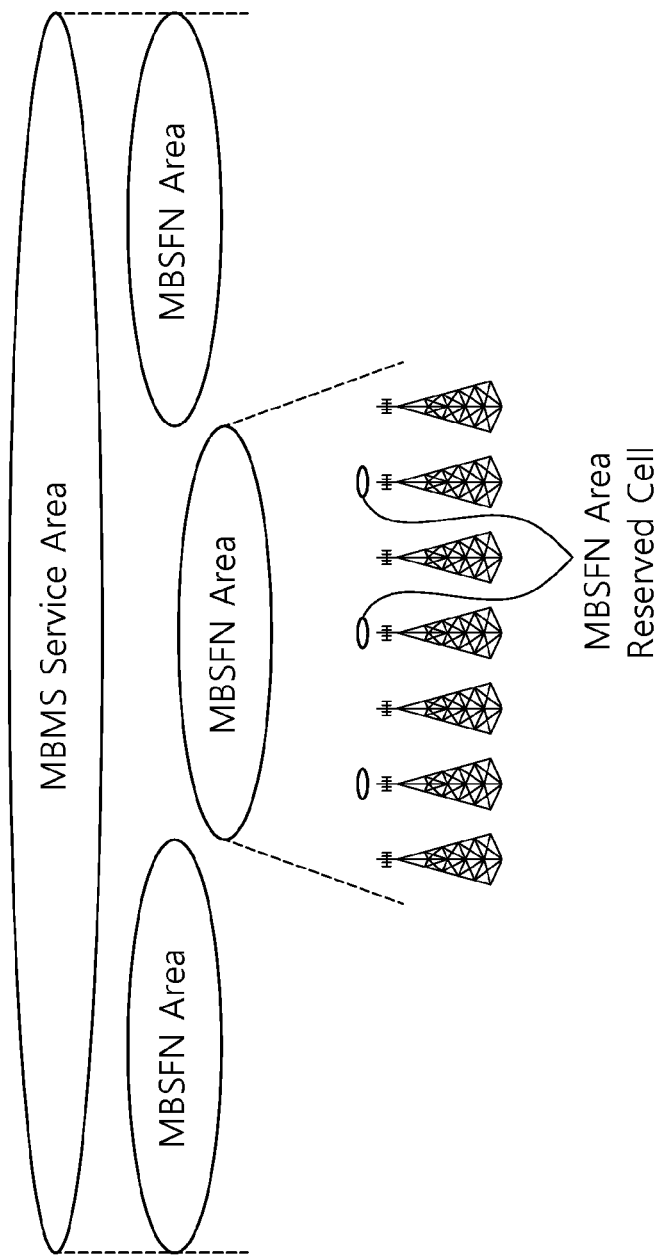
FIG. 7 shows MBMS definitions.

FIG. 7 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

The following principles govern the MCCH structure:
One MBSFN area is associated with one MCCH and one MCCH corresponds to one MBSFN area;
The MCCH is sent on MCH;
MCCH consists of a single MBSFN area configuration RRC message which lists all the MBMS services with ongoing sessions and an optional MBMS counting request message;
MCCH is transmitted by all cells within an MBSFN area, except the MBSFN area reserved cells;
MCCH is transmitted by RRC every MCCH repetition period;
MCCH uses a modification period;
A notification mechanism is used to announce changes of MCCH due to either session start or the presence of an MBMS counting request message: The notification is sent periodically throughout the modification period preceding the change of MCCH, in MBSFN subframes configured for notification. The downlink control information (DCI) format 1C with MBMS radio network temporary identity (M-RNTI) is used for notification and includes an 8-bit bitmap to indicate the one or more MBSFN area(s) in which the MCCH change(s). The UE monitors more than one notification subframe per modification period. When the UE receives a notification, it acquires the MCCH at the next modification period boundary;
The UE detects changes to MCCH which are not announced by the notification mechanism by MCCH monitoring at the modification period.

In general, the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. An MBMS capable UE may be only required to support reception of a single MBMS service at a time. The MCCH carries the MBSFNAreaConfiguration message, which indicates the MBMS sessions that are ongoing as well as the (corresponding) radio resource configuration. The MCCH may also carry the MBMSCounting Request message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH, i.e. both the time domain scheduling as well as the lower layer configuration are semi-statically configured, as defined within SystemInformationBlockType13.

For MBMS user data, which is carried by the MTCH logical channel, E-UTRAN periodically provides MSI at lower layers (MAC). This MCH information only concerns the time domain scheduling, i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by system frame number (SFN) values for which SFN mod m=0, where m is the number of radio frames comprising the modification period. The modification period is configured by means of SystemInformationBlockType13.

Figure 8:
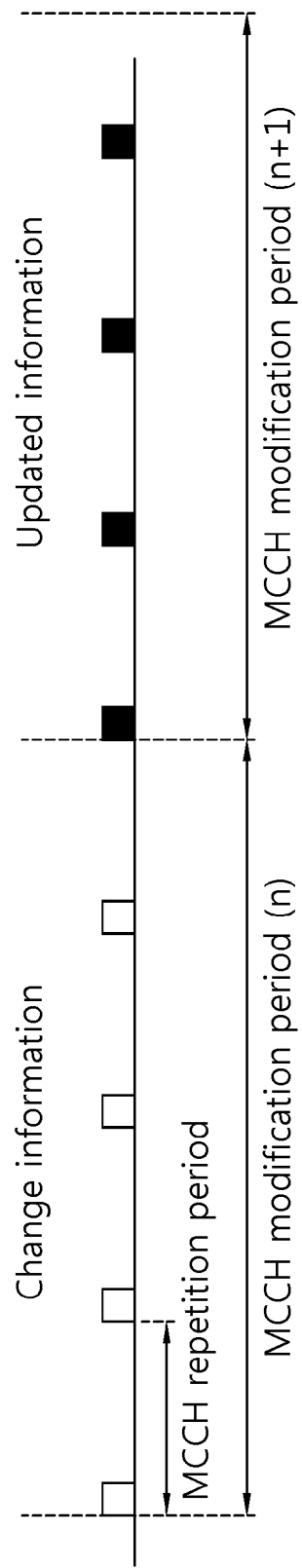
FIG. 8 shows change of MCCH information.

FIG. 8 shows change of MCCH information. When the network changes (some of) the MCCH information, it notifies the UEs about the change during a first modification period. In the next modification period, the network transmits the updated MCCH information. In FIG. 8, different colors indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI, on PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided, e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only. These MCCH information change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

The E-UTRAN may modify the MBMS configuration information provided on MCCH at the same time as updating the MBMS configuration information carried on BCCH, i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service shall acquire the MCCH information from the start of each modification period. A UE that is not receiving an MBMS service, as well as UEs that are receiving an MBMS service but potentially interested to receive other services not started yet in another MBSFN area, shall verify that the stored MCCH information remains valid by attempting to find the MCCH information change notification at least notificationRepetitionCoeff times during the modification period of the applicable MCCH(s), if no MCCH information change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

The UE applies the MCCH information acquisition procedure to acquire the MBMS control information that is broadcasted by the E-UTRAN. The procedure applies to MBMS capable UEs that are in RRC_IDLE or in RRC_CONNECTED.

A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH, which corresponds with the service that is being received, at the start of each modification period.

Unless explicitly stated otherwise in the procedural specification, the MCCH information acquisition procedure overwrites any stored MCCH information, i.e. delta configuration is not applicable for MCCH information and the UE discontinues using a field if it is absent in MCCH information unless explicitly specified otherwise.

Figure 9:
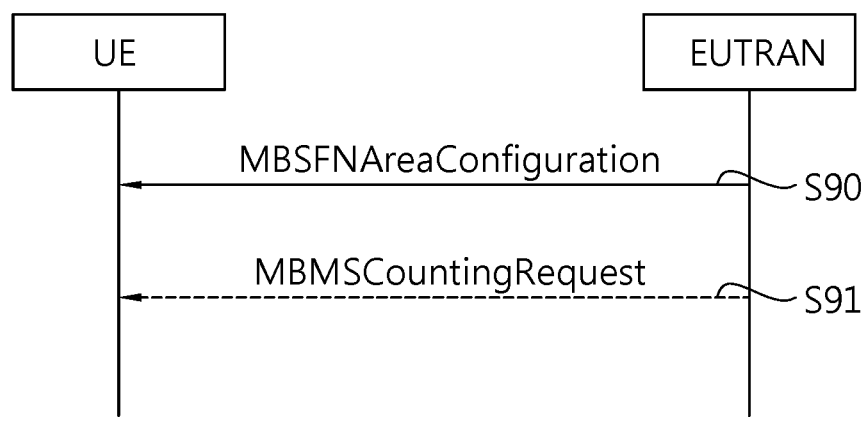
FIG. 9 shows a MCCH information acquisition procedure.

FIG. 9 shows a MCCH information acquisition procedure. An MBMS capable UE shall:

1> if the procedure is triggered by an MCCH information change notification:

2> start acquiring the MBSFNAreaConfiguration message (in step S90) and the MBMSCountingRequest message if present (in step S91), from the beginning of the modification period following the one in which the change notification was received;
1> if the UE enters an MBSFN area:
2> acquire the MBSFNAreaConfiguration message (in step S90) and the MBMSCountingRequest message if present (in step S91), at the next repetition period;
1> if the UE is receiving an MBMS service:
2> start acquiring the MBSFNAreaConfiguration message (in step S90) and the MBMSCountingRequest message if present (in step S91), that both concern the MBSFN area of the service that is being received, from the beginning of each modification period;

Logged MDT procedure may be performed for MBMS. Hereinafter, the logged MDT procedure for MBMS may be referred to as MBMS-MDT. For MBMS-MDT, the logged measurement configuration procedure for described in FIG. 6 may be performed in order to log of measurement results for MBSFN in both RRC_IDLE and RRC_CONNECTED. Further, for MBMS-MDT, the measurements logging procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig. For MBSFN areas from which the UE is receiving MBMS service, the UE may perform MBSFN measurements, and perform logging at regular time intervals, but only for those intervals for which MBSFN measurement results are available.

A system information acquisition procedure is described. It may be referred to Section 5.2.2 of 3GPP TS 36.331 V11.5.0 (2013 September). The UE applies the system information acquisition procedure to acquire the AS- and NAS-system information that is broadcasted by the E-UTRAN. The procedure applies to UEs in RRC_IDLE and UEs in RRC_CONNECTED.

The UE shall apply the system information acquisition procedure upon selecting (e.g. upon power on) and upon re-selecting a cell, after handover completion, after entering E-UTRA from another RAT, upon return from out of coverage, upon receiving a notification that the system information has changed, upon receiving an indication about the presence of an ETWS notification, upon receiving an indication about the presence of a CMAS notification, upon receiving a notification that the extended access barring (EAB) parameters have changed, upon receiving a request from CDMA2000 upper layers and upon exceeding the maximum validity duration. Unless explicitly stated otherwise in the procedural specification, the system information acquisition procedure overwrites any stored system information, i.e. delta configuration is not applicable for system information and the UE discontinues using a field if it is absent in system information unless explicitly specified otherwise.

Figure 10:
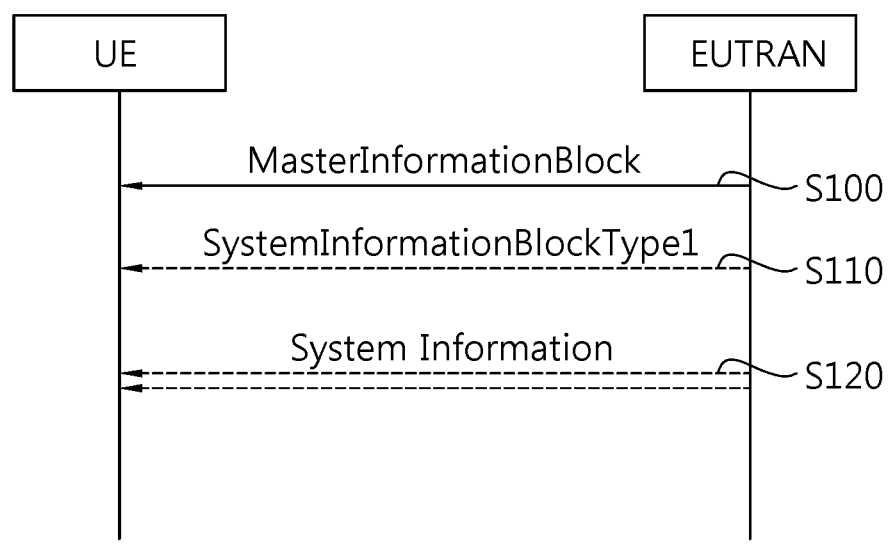
FIG. 10 shows a system information acquisition procedure.

FIG. 10 shows a system information acquisition procedure. The UE shall:
1> ensure having a valid version, as defined below, of (at least) the following system information, also referred to as the 'required' system information:
2> if in RRC_IDLE:
3> the MasterInformationBlock (step S100) and SystemInformationBlockType1 (step S11) as well as SystemInformationBlockType2 through SystemInformationBlockType8, depending on support of the concerned RATs;
2> if in RRC_CONNECTED:
3> the MasterInformationBlock (step S100), SystemInformationBlockType1 (step S110) and SystemInformationBlockType2 as well as SystemInformationBlockType8, depending on support of CDMA2000;
1> delete any stored system information after 3 hours from the moment it was confirmed to be valid, unless specified otherwise;
1> consider any stored system information except SystemInformationBlockType10, SystemInformationBlockType11, systemInformationBlockType12 and systemInformationBlockType14 to be invalid if systemInfoValueTag included in the SystemInformationBlockType1 is different from the one of the stored system information;

The UE shall:
1> apply the specified BCCH configuration;
1> if the procedure is triggered by a system information change notification:
2> start acquiring the required system information from the beginning of the modification period following the one in which the change notification was received.

The UE continues using the previously received system information until the new system information has been acquired.
1> if the UE is in RRC_IDLE and enters a cell for which the UE does not have stored a valid version of the system information required in RRC_IDLE:
2> acquire, using the system information acquisition procedure, the system information required in RRC_IDLE;
1> following successful handover completion to a primary cell (PCell) for which the UE does not have stored a valid version of the system information required in RRC_CONNECTED:
2> acquire, using the system information acquisition procedure, the system information required in RRC_CONNECTED;
2> upon acquiring the concerned system information:
3> discard the corresponding radio resource configuration information included in the radioResourceConfigCommon previously received in a dedicated message, if any;
1> following a request from CDMA2000 upper layers:
2> acquire SystemInformationBlockType8;
1> neither initiate the RRC connection establishment procedure nor initiate transmission of the RRCConnectionReestablishmentRequest message until the UE has a valid version of the MasterInformationBlock and SystemInformationBlockType1 messages as well as SystemInformationBlockType2;
1> not initiate the RRC connection establishment subject to EAB until the UE has a valid version of SystemInformationBlockType14, if broadcast;
1> if the UE is ETWS capable:
2> upon entering a cell during RRC_IDLE, following successful handover or upon connection re-establishment:
3> discard any previously buffered warningMessageSegment;
3> clear, if any, the current values of messageIdentifier and serialNumber for SystemInformationBlockType11;
2> when the UE acquires SystemInformationBlockType1 following ETWS indication, upon entering a cell during RRC_IDLE, following successful handover or upon connection re-establishment:
3> if schedulingInfoList indicates that SystemInformationBlockType10 is present:
4> start acquiring SystemInformationBlockType10 immediately;
3> if schedulingInfoList indicates that SystemInformationBlockType11 is present:

4> start acquiring SystemInformationBlockType11 immediately.

UEs shall start acquiring SystemInformationBlockType10 and SystemInformationBlockType11 as described above even when systemInfoValueTag in SystemInformationBlockType1 has not changed.

1> if the UE is CMAS capable:
2> upon entering a cell during RRC_IDLE, following successful handover or upon connection re-establishment:
3> discard any previously buffered warningMessageSegment;
3> clear, if any, stored values of messageIdentifier and serialNumber for SystemInformationBlockType12 associated with the discarded warningMessageSegment;
2> when the UE acquires SystemInformationBlockType1 following CMAS indication, upon entering a cell during RRC_IDLE, following successful handover and upon connection re-establishment:
3> if schedulingInfoList indicates that SystemInformationBlockType12 is present:
4> acquire SystemInformationBlockType12;

UEs shall start acquiring SystemInformationBlockType12 as described above even when systemInfoValueTag in SystemInformationBlockType1 has not changed.

1> if the UE is interested to receive MBMS services:
2> if schedulingInfoList indicates that SystemInformationBlockType13 is present and the UE does not have stored a valid version of this system information block:
3> acquire SystemInformationBlockType13;
2> if the UE is capable of MBMS Service Continuity:
3> if schedulingInfoList indicates that SystemInformationBlockType15 is present and the UE does not have stored a valid version of this system information block:
4> acquire SystemInformationBlockType15;
1> if the UE is EAB capable:
2> when the UE does not have stored a valid version of SystemInformationBlockType14 upon entering RRC_IDLE, or when the UE acquires SystemInformationBlockType1 following EAB parameters change notification or upon entering a cell during RRC_IDLE:
3> if schedulingInfoList indicates that SystemInformationBlockType14 is present:
4> start acquiring SystemInformationBlockType14 immediately;
3> else:
4> discard SystemInformationBlockType14, if previously received;

EAB capable UEs start acquiring SystemInformationBlockType14 as described above even when systemInfoValueTag in SystemInformationBlockType1 has not changed. EAB capable UEs maintain an up to date SystemInformationBlockType14 in RRC_IDLE.

The UE may apply the received SIBs immediately, i.e. the UE does not need to delay using a SIB until all SI messages have been received. The UE may delay applying the received SIBs until completing lower layer procedures associated with a received or a UE originated RRC message, e.g. an ongoing random access procedure. While attempting to acquire a particular SIB, if the UE detects from schedulingInfoList that it is no longer present, the UE should stop trying to acquire the particular SIB.

As described above, the system information acquisition procedure overwrites any stored information. If the UE is handed over from one cell to another cell, the stored system information may be overwritten or discarded. Meanwhile, the MBMS-MDT configuration may be transmitted via system information. According to the prior art, for the UE which was configured to perform MBMD-MDT, if the UE moves from a cell, which provides the MBMS-MDT configuration via system information, to a new cell, which does not provide the MBMS-MDT configuration via system information, the UE does not perform MBMS-MDT any more in the new cell, since there is no MBMS-MDT configuration in the new cell. This is against the purpose of MBMS-MDT, which allowing for the network operator harvesting of network coverage and quality information from UEs related to MBMS for MBSFN area, which can include multiple cells.

In order to solve the problem described above, the MBMS-MDT configuration received via system information of a previous cell needs to be maintained even after the UE is handed over to a new cell. Hereinafter, a method for maintaining a MBMS-MDT configuration according to an embodiment of the present invention is described. According to an embodiment of the present invention, the MBMS-MDT configuration received via first system information is maintained if second system information does not provide the MBMS-MDT configuration or the MBMS-MDT configuration in the second system information is the same as the stored MBMS-MDT configuration. In this case, the UE does not release the stored MBMS-MDT configuration, and keeps performing MBMS-MDT based on the stored MBMS-MDT configuration configured by previous cell even though the UE moves to the new cell.

Figure 11:
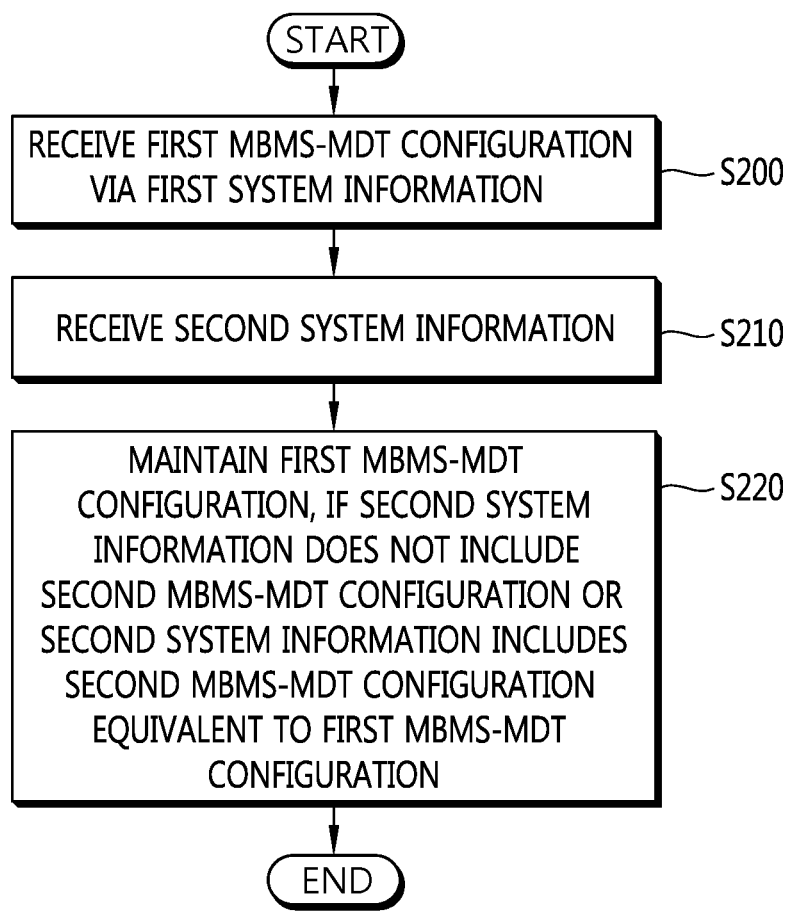
FIG. 11 shows an example of a method for maintaining a MBMS-MDT configuration according to an embodiment of the present invention.

FIG. 11 shows an example of a method for maintaining a MBMS-MDT configuration according to an embodiment of the present invention.

In step S200, the UE receives the first MBMS-MDT configuration via first system information. The MBMS-MDT configuration may used by the network to configure the UE to perform MBMS-MDT for MBMS the UE is receiving. The UE stores the first MBMS-MDT configuration. The MBMS-MDT configuration may be received via the existing system information, e.g. system information block (SIB) 1, SIB2, etc. Or, new SIB may be defined for the MBMS-MDT configuration. The modification period of the MBMS-MDT configuration may be the same as that of existing system information. The MBMS-MDT configuration may include at least one of logging duration, logging interval, MBMS measurement duration, MBMS measurement interval, MBSFN area identity list, or timer T330m. Upon receiving the MBMS-MDT configuration, the UE may start T330m. Upon log volume exceeding the suitable UE memory, or upon initiating the release of MBMS-MDT configuration procedure, the UE may stop T330m. Upon expiry of T330m, the UE may release MBMS-MDT configuration and stop to perform the MBMS-MDT. T330m may be configured by the network, or may be pre-defined. Further, the first system information may include other configurations which do not correspond to the MBMS-MDT configuration. The UE may also store the other configurations.

In step S210, the UE receives second system information. The UE may acquire other configurations from the second system information. The first system information and the second system information may be received from the same cell. Alternatively, if the UE performs handover from the first cell to the second cell, the first system information may be received from the first cell, and the second system information may be received from the second cell.

In step S220, the UE maintains the first MBMS-MDT configuration, if the second system information does not provide the second MBMS-MDT configuration or the second MBMS-MDT configuration included in the second system information is equivalent to the first MBMS-MDT configuration. More specifically, the UE may identify absence of the second MBMS-MDT configuration in the second system information. Therefore, the UE may maintain the stored first MBMS-MDT configuration, while overwriting the stored other configurations with the acquired other configurations. Alternatively, the UE may acquire the second MBMS-MDT configuration from the second system information. The UE may maintain the stored first MBMS-MDT configuration, if the stored first MBMS-MDT configuration is equivalent to the acquired second MBMS-MDT configuration, while overwriting the stored other configurations with the acquired other configurations. The value tag or paging message may be used to check whether the stored first MBMS-MDT configuration is equivalent to the acquired second MBMS-MDT configuration. If the first MBMS-MDT configuration is maintained, the UE may keep performing MBMS-MDT based on the stored first MBMS-MDT configuration.

If the stored first MBMS-MDT configuration is different from the acquired second MBMS-MDT configuration, the UE overwrites the stored first MBMS-MDT configuration with the acquired second MBMS-MDT configuration. The UE may perform MBMS-MDT based on the acquired second MBMS-MDT configuration.

Performing of the MBMS-MDT may include performing MBMS measurements, logging measurement results, and reporting logged results. The MBMS measurements to be performed by the UE for the MBMS-MDT may include MBSFN reference signal received power (RSRP)/reference signal received quality (RSRQ) per MBSFN area, MCH block error rate (BLER) per MCS, per MCH, and per MBSFN area, and/or the amount of received RLC SDUs for a certain period of time. Further, if the second MBMS-MDT configuration which is different from the stored first MBMS-MDT configuration is acquired, the UE may reconfigure the MBMS-MDT. Upon deciding to perform MBMD-MDT reconfiguration, the UE may perform discarding the logged measurement configuration as well as the logged measurement information, storing the received information included in the MBMS-MDT configuration, and starting timer related to logging duration.

Figure 12:
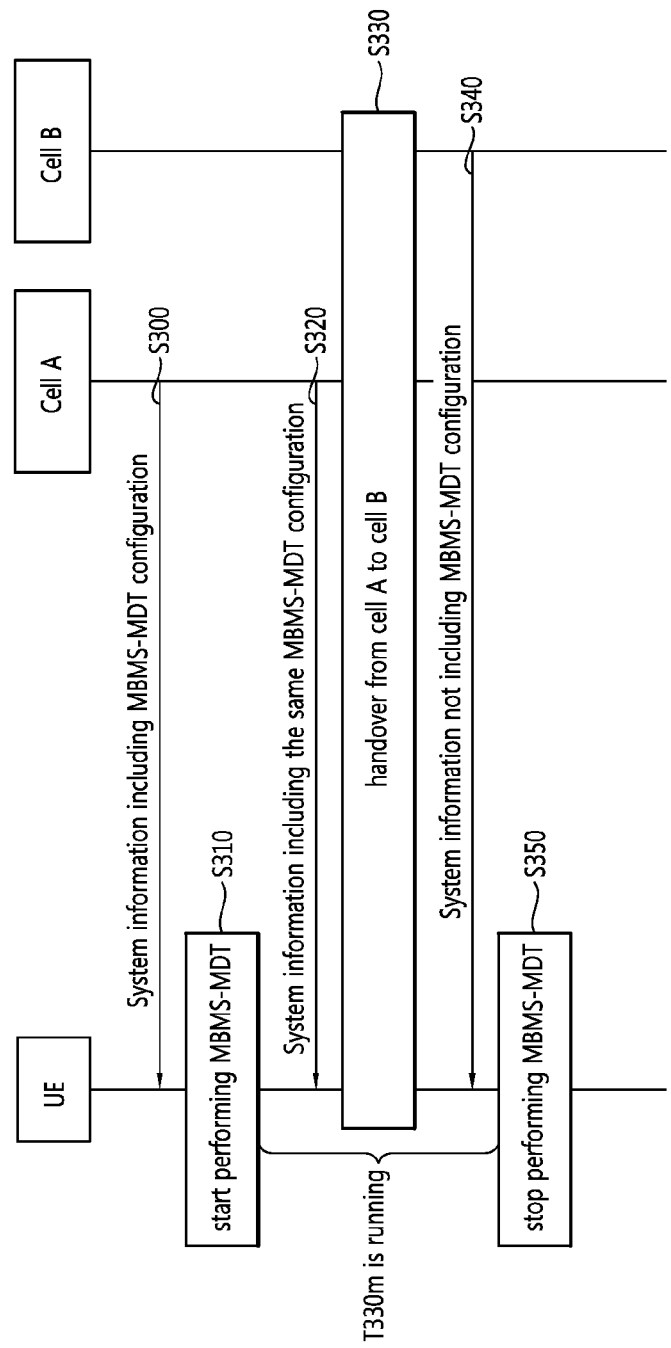
FIG. 12 shows another example of a method for maintaining a MBMS-MDT configuration according to an embodiment of the present invention.

FIG. 12 shows another example of a method for maintaining a MBMS-MDT configuration according to an embodiment of the present invention.

In step S300, the UE receives system information including the MBMS-MDT configuration from the serving cell, cell A. The UE stores the received MBMS-MDT configuration.

In step S310, upon receiving the MBMS-MDT configuration, the UE starts to perform MBMS-MDT according to the stored MBMS-MDT configuration and starts the timer T330m.

In step S320, the UE receives system information including the new MBMS-MDT configuration from cell A. Upon receiving the new MBMS-MDT configuration, the UE decides whether to perform MBMS-MDT reconfiguration or ignore the new MBMS-MDT configuration. It is assumed that the new MBMS-MDT configuration is equal to the stored MBMS-MDT configuration. So, the UE ignores the new MBMS-MDT configuration.

In step S330, the UE is handed over to cell B.

In step S340, the UE receives system information not including the MBMS-MDT configuration from the serving cell, cell B.

The timer T330m is still running So, in step S350, the UE does not release the stored MBMS-MDT configuration, and keeps performing the MBMS-MDT according to the stored MBMS-MDT configuration.

In step S360, the timer T330m expires. Upon expiry of the timer T330m, the UE releases the stored MBMS-MDT configuration and stop performing the MBMS-MDT.

Figure 13:
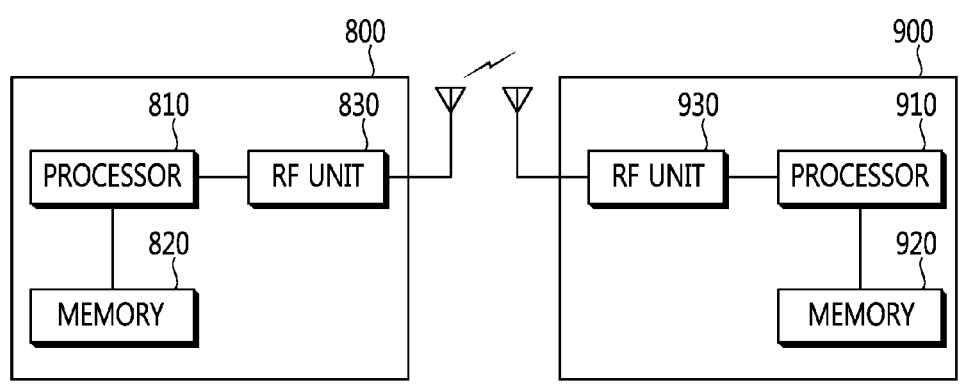
FIG. 13 shows a wireless communication system to implement an embodiment of the present invention.

FIG. 13 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for maintaining, by a user equipment (UE), a multimedia broadcast multicast service (MBMS) minimization of drive test (MDT) configuration in a wireless communication system, the method comprising:

receiving, by the UE, a first MBMS-MDT configuration via first system information from a first cell;

starting, by the UE, a MBMS-MDT based on the first MBMS-MDT configuration in the first cell;

performing, by the UE, handover procedure from the first cell to a second cell;

receiving, by the UE, a second MBMS-MDT configuration via second system information from the second cell;

checking, by the UE, whether the first MBMS-MDT configuration is equivalent to the second MBMS-MDT configuration, by comparing value tags assigned to the first MBMS-MDT configuration and the second MBMS-MDT configuration, respectively; and maintaining, by the UE, the ongoing MBMS-MDT based on the first MBMS-MDT configuration while the UE is located in the second cell, when the first MBMS-MDT configuration is equivalent to the second MBMS-MDT configuration.

2. The method of claim 1, wherein the MBMS-MDT comprises performing MBMS measurements, logging measurement results and reporting logged results.

3. The method of claim 2, wherein the MBMS measurements includes at least one of a MBSFN reference signal received power (RSRP) per MBSFN area, a MBSFN reference signal received quality (RSRQ) per MBSFN area, multicast channel (MCH) block error rate (BLER) per modulation and coding scheme (MCS), per MCH, and per MBSFN area, or amount of received radio link control (RLC) service data units (SDUs) for a certain period of time.

4. The method of claim 1, wherein the first MBMS-MDT configuration includes at least one of a logging duration, a logging interval, a MBMS measurement duration, a MBMS measurement interval, a MBSNF area identity list, or a timer T330m.

5. The method of claim 4, wherein the timer T330m starts upon receiving the first MBMS-MDT configuration.

6. The method of claim 4, wherein the timer T330m stops upon log volume exceeding capability of a memory of the UE, or upon initiating release of a MBMS-MDT configuration procedure.

7. The method of claim 1, wherein the first MBMS-MDT configuration is received via an existing system information block (SIB) or a newly defined SIB for MBMS-MDT, in the first system information.

8. The method of claim 1, further comprising performing, by the UE, MBMS-MDT based on the second MBMS-MDT configuration, if the second system information includes the second MBMS-MDT configuration which is different from the first MBMS-MDT configuration.

9. A user equipment (UE) configured to maintain a multimedia broadcast multicast service (MBMS) minimization of drive test (MDT) configuration in a wireless communication system, the UE comprising:

a radio frequency (RF) unit configured to transmit or receive a radio signal; and a processor coupled to the RF unit, and configured to:
receive a first MBMS-MDT configuration via first system information from a first cell;
start a MBMS-MDT based on the first MBMS-MDT configuration in the first cell;
perform handover procedure from the first cell to a second cell;
receive a second MBMS-MDT configuration via second system information from the second cell;
check whether the first MBMS-MDT configuration is equivalent to the second MBMS-MDT configuration, by comparing value tags assigned to the first MBMS-MDT configuration and the second MBMS-MDT configuration, respectively; and
maintain the ongoing MBMS-MDT based on the first MBMS-MDT configuration while the UE is located in the second cell, when the first MBMS-MDT configuration is equivalent to the second MBMS-MDT configuration.

10. The UE of claim 9, wherein the MBMS-MDT comprises performing MBMS measurements, logging measurement results and reporting logged results.

11. The UE of claim 10, wherein the MBMS measurements includes at least one of a MBSFN reference signal received power (RSRP) per MBSFN area, a MBSFN reference signal received quality (RSRQ) per MBSFN area, multicast channel (MCH) block error rate (BLER) per modulation and coding scheme (MCS), per MCH, and per MBSFN area, or amount of received radio link control (RLC) service data units (SDUs) for a certain period of time.

* * * * *